United States Patent
Gibson et al.

(10) Patent No.: US 7,659,331 B2
(45) Date of Patent: Feb. 9, 2010

(54) SHAPEABLE RESIN COMPOSITIONS

(75) Inventors: Brian L. Gibson, Bloomfield, NJ (US);
Fred Durrenberger, Columbia, MO (US); Francis Sim, Allentown, PA (US); James E. Garft, Yardley, PA (US)

(73) Assignee: Honeywell International Inc, Morristown, NJ (US)

( * ) Notice: Subject to any disclaimer, the term of this patent is extended or adjusted under 35 U.S.C. 154(b) by 516 days.

(21) Appl. No.: 11/131,694

(22) Filed: May 17, 2005

(65) Prior Publication Data

US 2005/0209375 A1   Sep. 22, 2005

Related U.S. Application Data

(63) Continuation-in-part of application No. 10/766,430, filed on Jan. 28, 2004.

(60) Provisional application No. 60/445,492, filed on Feb. 6, 2003.

(51) Int. Cl.
C08K 5/15    (2006.01)
D01F 1/02    (2006.01)

(52) U.S. Cl. .......................... 524/57; 264/211
(58) Field of Classification Search ............ 524/57; 264/211
See application file for complete search history.

(56) References Cited

U.S. PATENT DOCUMENTS

| | | | | |
|---|---|---|---|---|
| 3,635,856 | A * | 1/1972 | Kaneko et al. | 524/57 |
| 4,283,310 | A * | 8/1981 | James et al. | 524/278 |
| 5,924,455 | A * | 7/1999 | Jo et al. | 138/97 |
| 6,121,440 | A | 9/2000 | Kenneally et al. | |
| 6,504,003 | B1 | 1/2003 | Trout et al. | |

FOREIGN PATENT DOCUMENTS

| | | | |
|---|---|---|---|
| JP | 1994306188 A | | 11/1994 |
| JP | 1994306188 A | * | 11/1994 |

| | | | |
|---|---|---|---|
| WO | 2004/072167 A1 | | 8/2004 |

OTHER PUBLICATIONS

Trade literature obtained from http:I/www.mfc.co.jp/english/index.htm, Mitsubishi-Kagaku Foods Corporation, copyright 2002.*
J. Edenbaum, Ed., Plastic Additives and Modifiers Handbook, Van Nostrand Reinhold, New York 1992, Chapter 3.
Trade literature obtained from http://www.mfc.co.jp/english/index.htm, Mitsubishi-Kagaku Foods Corporation, copyright 2002.

* cited by examiner

*Primary Examiner*—William K Cheung
(74) *Attorney, Agent, or Firm*—Carrie Beatus

(57) ABSTRACT

The present invention provides a shapeable resin-containing composition comprising at least one saccharide ester, preferably according to Formula I.

Formula I:

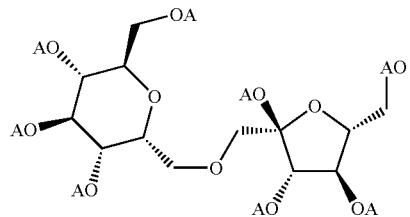

wherein "A" is hydrogen or has the structure of Structure I:

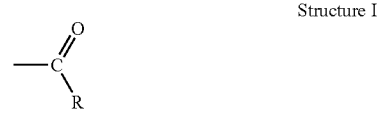

Structure I wherein "R" is an aliphatic or aromatic moiety of about eight to about 40 carbon atoms, and wherein at least one "A" moiety of Formula I is a moiety of Structure I. Also provided are shaping methods and shaped products based on the present compositions.

47 Claims, No Drawings

SHAPEABLE RESIN COMPOSITIONS

CROSS REFERENCE TO RELATED APPLICATIONS

The present application is continuation-in-part of co-pending U.S. application Ser. No. 10/766,430, filed Jan. 28, 2004, which in turn is based on and claims the priority benefit of U.S. provisional application No. 60/445,492 filed Feb. 6, 2003, which is incorporated herein by reference.

BACKGROUND OF THE INVENTION

Forming and shaping of thermoplastic materials, such as polyvinyl chloride (PVC) resin, generally requires heating a mass of the thermoplastic material to a temperature at which it can undergo plastic flow. Depending on the type of formation techniques used, this heated mass will be generally subject to shear stresses that form the mass into the desired shaped. In extrusion operations, for example, the heated mass is subsequently forced through a plate containing one or more orifice openings, sometimes referred to as a die plate, to impart a profile shape to the emerging extrudate. The extrudate is then cooled until it becomes sufficiently rigid to retain the profile shape. In calendering, the heated mass is forced into the nip between a roll and another object, such as a knife blade or other roll, and thereby sheeted into the desired shape and thickness.

In general a shaping feedstock composition is prepared by combining a thermoplastic polymer, such as PVC resin, with one or more adjuvants, such as lubricants. For example, extrudable PVC compositions are described in Handbook of Plastic Materials and Technology, Ed. I. Rubin, Wiley-Interscience, John Wiley & Sons, Inc. New York, 1990 and Plastics Additives and Modifiers Handbook, Ed. J. Edenbaum, Van Nostrand Reinhold, New York 1992, Chapter 3, each of which is incorporated herein by reference. Examples of additional components include filler, for example calcium carbonate, processing aids, for example acrylic copolymers, and stabilizer which imparts heat stability to the composition during the extrusion process, for example, a tin based stabilizer such as TM281® from Rohm & Haas. The composition is commonly then "fused", that is, subjected to heating and blending, for example in a two mill roll, until it forms a plastic composition which is substantially homogeneous. The various additives and the amounts of the additives used influence the properties of the feedstock composition both during the fusion process and after it has been "fused." The properties of the composition in turn affect the performance, such as processability, of the material during shaping, such as in extrusion and/or calendering or in follow-on processes, in which the feedstock material is employed. Of the various components comprising typical PVC feedstock compositions, the lubricant included in the composition can have an important influence on one or more of the properties related to processability, as well as on the quality of a the shaped article.

Dimensional stability is an important characteristic affecting the commercial value of a shaped product and hence of the processes and the components used to make the extruded product. Dimensional stability is assessed by observing the amount by which a shaped article expands during solidification after it emerges from the shaping apparatus or tool, such as the die plate in an extrusion operation or the calendaring nip in a calendering operation. The amount of expansion is sometimes referred to as swell or die swell.

For a given shapeable feedstock composition, it is generally possible to increase the rate at which material is shaped. However, such shaping rate increases have practical limitations. For example, it is possible to obtain extrusion rate increases by operating the extruder at a higher temperature and/or at a higher head pressure. However, at some point of increasing extruder temperature the extrudable composition will generally begin to scorch, and the surface and structural qualities of the extrudate will begin to degrade. Similar effects occur in other shaping operations. Furthermore, as the amount of force used to shape the mass is increased, such as increasing the head pressure or extruder torque, a point is generally reached at which the dimensional stability and/or surface condition of the shaped material is unacceptable. These process limitations have created practical limits on the rate at which prior compositions could be extruded, calendered and the like.

Another mechanism that is at least theoretically available to achieve higher shaping rates is to increase the amount and/or type of lubricant incorporated into the formable feedstock composition. However, it is also possible that increasing the amount of the lubricant or changing the type of lubricant can have deleterious effects on the shaped product and/or on other aspects of the shaping process. For example, increasing the amounts of certain lubricants known as internal lubricant may compromise one or more the inherent physical properties of a shaped article, such an improvement in deflection temperature under load (DTUL) of the shaped article. Also, increased amounts of external lubricant may negatively impact not only the strength of the shaped product, but may also increase the fusion time, which increases the overall processing time.

It has been suggested that certain combinations of materials may be used as a lubricant in extrudable PVC compositions. For example, European Patent Application No. 79302422.5 discloses a PVC composition which incorporates as an alkaline earth metal or zinc soap as a stabilizer and mixed glycerides as a lubricant. The patent also indicates that sucrose mono- and di-esters may optionally included in the lubricant, in amounts ranging from about 20% to about 35% by weight of the composition. The patent does not disclose the acids from which the sucrose ester is formed, except to imply that they result from transesterification of sucrose with triglycerides. While it may be possible that some measure of success can be achieved in accordance with the teachings of European Patent Application No. 79302422.5, applicants have discovered that certain types of sucrose esters are highly undesirable from a performance standpoint, from a cost standpoint, or both.

Applicants have thus come to recognize the need for formable or shapeable compositions, particularly PVC-based compositions, having one or more of those desirable shaping characteristics associated with high levels of lubricant while reducing or substantially eliminating one or more or the adverse effects that would otherwise be associated with a high level of lubricant. The present methods, feedstock compositions and shaped articles meet this and other needs.

SUMMARY OF THE INVENTION

One aspect of the present invention provides shapeable compositions, more preferably extrudable, calenderable or injection moldable compositions comprising or consisting essentially of thermoplastic polymer such as polyvinylchloride, and at least one disaccharide ester, preferably disaccharide ester, and even more preferably sucrose ester.

In highly preferred embodiments of the present invention the saccharide ester of the present compositions comprises one or more saccharide ester compounds in which, on average, at least about 80%, and even more preferably at least about 90% of the hydroxyl sites on the sacharide have been esterified, preferable with stearic acid or a derivative of stearic acid. In highly preferred embodiments, the saccharide ester component comprises at least about 50%, more preferably at least about 60%, more preferably at least about 70%, and even more preferably at least about 80% to about 90% on a molar basis, of disaccharide esters, preferably sucrose esters and even more preferably sucrose esters of stearic acid, in which at least six hydroxyl cites have been esterified.

Applicants have discovered that the compositions of the present inventions are capable of exhibiting a highly desirable yet difficult to obtain combination of properties. For example, in certain preferred embodiments the present shapeable compositions are capable of exhibiting desirably low apparent viscosity values and/or other properties which are generally advantageous and/or desirable for the processing characteristics of the composition, while at the same time being capable of being shaped into a solid form with desirable properties, such as relatively high tensile strength, and/or a relatively high degree of dimensional stability, and/or a high degree of color stability.

Another aspect of the present invention involves processes for shaping, preferably by extrusion, calendering or molding, including injection and blow molding, a thermoplastic composition, preferably a polyvinyl chloride-based composition. The process preferably comprises:

a) providing a shapeable thermoplastic mass comprising at least one thermoplastic polymer and at least one saccharide ester as described above; and b) exposing said mass to shear stress, preferably by forcing the mass through the nozzle of an injection molder, the nip of a calender roll, or the die of an extruder, to form a shaped article.

Saccharide ester is preferably present in the composition in an amount effective to improve the shapability of the mass, preferably by at least about 10 percent, more preferably by at least about 20 percent, and even more preferably at least about 30 percent, relative to the shapeability of the mass in the absence of the saccharide ester of the present invention. The shapeability of a mass can be measured by any one of several characteristics of the mass, as is know to those skilled in the art and/or as described in detail hereinafter. The invention in certain preferred embodiments provides an improvement in extrudability, calenderability, and/or moldability of the mass.

In certain embodiments of the invention, the improvement in shapeability and/or the properties of the shaped article may result from the presence of saccharide ester of the present invention in combination with one or more other compounds which produce the improvement by working together. For example, certain combinations of saccharide ester and certain oxidized polyethylene waxes result in improvements which would not necessarily occur with either component alone. Such embodiments are also within the scope for the present invention.

According to another aspect of the present invention, shaped articles are provided based upon and/or formed using the compositions and/or the methods of the present invention.

DETAILED DESCRIPTION OF PREFERRED EMBODIMENTS

Although it is contemplated that the present invention will have the greatest applicability in connection with shaping of thermoplastic polymers, it is believed that it will also have applicability to other shapeable compositions. For example, ram extrusion of polymers that are not strictly thermoplastic, such as polytetrafluoroethylene (PTFE), may be beneficially affected by the present invention. Therefore, the term "shapeable composition", unless otherwise indicated, is used herein to refer not only to composition that contain polymers with thermoplastic properties, but also those polymers that are readily shapeable by known techniques or otherwise behave similar to thermoplastic polymers with respect to extrusion processes, calendering processes, molding processes and the like. Such shapeable polymers, whether thermoplastic or otherwise, are sometimes referred to herein for convenience as resins.

The Methods

The present invention is directed in one aspect to methods of forming shaped articles from a feedstock composition. As used herein, the term "feedstock composition" is used in its broad sense to refer to compositions of the type adaptable to be shaped into an article through one or more processes of the type described herein. In connection with the preferred resin based on PVC and/or PVC copolymers, it is contemplated that the present methods have the capability of providing some benefit to all processes for shaping such compositions, including by not necessarily limited to extrusion, foam extrusion, calendering, injection molding, foam injection molding, blow molding, compression molding, plastisol processing (including knife coating, roller coating and casting), dip and slush molding, and low pressure injection molding, and any combinations of these. It is expected that particular advantage can be achieved by use of the present invention as part of or in connection with extrusion, calendering, compression molding and injection molding.

Generally, the first step of the present methods is to provide a shapable feedstock composition in accordance with the present invention. Although it is contemplated that the feedstock composition may be provided by any means known in the art, it is generally preferred that the composition is formed by combining at least one resin and a saccharide ester of the present invention under conditions effective to form a shapeable composition. Likewise, it is contemplated that numerous techniques can be used to combine the components, and all such techniques are within the broad scope of the present invention. In certain embodiments, the step of combining the components is carried out in a high intensity mixer. Other combining techniques include introducing one or more of the components by introducing them into a screw, preferably a twin screw ribbon blender. Of course these and other mixing or combining techniques can be combined and used together in various sequences.

As is known in the art, the requirements of a shapeable composition vary widely, depending upon the shaping equipment being used and the desired properties of the shaped product, among other factors, and all such shapeable feedstock compositions are within the scope of the present invention. Generally, these conditions include combining the resin, saccharide ester and one or more other components that may be present, preferably to form a substantially homogeneous mixture, suspension, or the like. In certain preferred embodiments, the combining or blending step causes shear heating within the composition, and the combination of shear and heat cause the individual particles of the composition to soften and fuse, creating a substantially homogeneous mass. At the point of fusing (fusion point), the identity of individual particulates in the composition is preferably substantially lost.

When such heating and blending is performed under known standard testing conditions, the period of blending required to reach the fusion point is referred to as the "fusion time." Generally, at the fusion point, the viscosity of the composition is at a maximum, and it is at about this same point that a maximum will occur in the torque required to fuse the mass. The torque maximum is related to the fusion viscosity and is reported as fusion torque. With continued blending, it is expected that the viscosity of the composition, and the torque required to blend the composition, will decrease to a relatively steady state condition. The steady state value is referred to as the equilibrium viscosity, the temperature of the composition at this point is referred to as the equilibrium temperature, and the torque required to blend the composition at this point is referred to as equilibrium torque. With further continued blending, it is expected that the composition would begin to cross-link and the viscosity of the composition, and hence the blending torque, would begin to rise. The elapsed time between the fusion point and the beginning of a measurable rise in viscosity due to cross-linking is referred to as the stability time.

The methods of the present invention then generally require shaping the provided composition, preferably by exposing the composition to shaping sheer forces, to form a shaped article. Preferably, the shaping step includes bringing the shapeable composition of the present invention to a temperature at which it can undergo plastic flow. In preferred embodiments this comprises heating the composition and forcing the shapeable composition under pressure through a relatively narrow or small opening created by at least one solid object. In the case of extrusion, for example, the opening is preferably in the form of a die containing one or more orifice openings or the like to impart a profile shape to the emerging extrudate. In the case of calendering, the opening is preferably formed by the nip between two rolls. In injection molding the opening is generally in the form of nozzle and/or channels/runners and/or mold cavities and features. In compression molding, a mass of the shapeable composition is placed in an appropriate heated mold cavity and is then shaped by exposure to compression under relatively high pressure, which in turn of course exposes the shapeable composition to shear as the composition is forced to flow into and around the mold cavities and other features of the mold.

One important characteristic of the present methods, and a technique which can be used to measure shapeability in general, and particularly extrudability, relates to the amount of force required to force the present composition through a die plate. In general, the step of forcing the shapeable composition through a die plate in accordance with the present methods advantageously requires an amount of force which is relatively low in comparison to other methods capable of producing a shaped article of comparable quality to that which can be produced in accordance with the present invention. The compositions of the present invention include saccharide ester, preferably disaccharide ester, and even more preferably sucrose ester in an amount effective to reduce the force required to force the extrudable mass through the die by at least about 10 percent, more preferably by at least about 20 percent, and even more preferably at least about 30 percent, relative to the force required to force the shapeable mass through the die, with all other conditions being substantially the same except for the absence of the present saccharide ester. In certain highly preferred embodiments, the saccharide ester, which is preferably esterified with stearic acid or stearic acid derivative, has on average at least about 80%, and even more preferably at least about 90%, of the hydroxyl sites esterified, preferable with stearic acid.

Although applicants do not intend to be bound by or to any particular theory of operation, it is believed that the presence of saccharide ester in the preferred shapeable composition of the present invention provides the benefit of both internal and external lubrication while avoiding to at least some degree one or more of the deleterious effects heretofore often associated with internal or external lubricants. An "internal lubricant" is generally believed to have an effect on the processability of the composition by facilitating intermolecular slippage and thereby reducing the cohesive forces which impart viscosity to the composition. By lowering these forces, it is believed that the polymer molecules which make up most of the mass of the composition are able to more easily "slip" past each other with greater ease when pressure is applied. However, internal lubricants have heretofore been frequently associated with creating or contributing to certain disadvantages. For example, one potentially important disadvantage of internal lubricant usage has been the problem of deterioration in heat distortion properties of the shaped product. As explained in more detail hereinafter, the present compositions, methods and systems are capable in certain embodiments of achieving the benefit normally associated with the use of internal lubrication while at the same time avoiding deterioration in the heat distortion properties of the shaped product, and in some cases actually contributing to an improvement in such properties. This is both highly beneficial and unexpected.

On the other hand, external lubricants have heretofore also frequently demonstrated that the advantages achieved by the use thereof come at the cost of deterioration in a processability parameter and/or the quality of the shaped product. For example, external lubricants have heretofore frequently caused a delay in fusion of the extrudable composition and in many cases have resulted in reduced physical properties of the shaped product. Of particular concern in this regard has been a marked deterioration in the important property of impact resistance. Because the compositions of the present invention also exhibit improvements heretofore normally associated with external lubrication, it would have been expected that the present compositions and methods would be associated with poor physical properties of the shaped product, particularly impact resistance. As explained in detail hereinafter, applicants have surprising and beneficially discovered that this is not the case in certain important embodiments.

The saccharide esters of the present invention thus preferably produce a decrease in the apparent viscosity of the shapeable composition, which is another measure of shapeability of the composition. In certain embodiments, therefore, the saccharide ester is present in the composition in an amount effective to reduce the apparent viscosity of the composition by at least about 10 percent, more preferably by at least about 20 percent, and even more preferably at least about 30 percent, relative to the apparent viscosity of the composition with all other conditions being substantially the same except for the presence of saccharide ester.

The preferred shapeable compositions of the present invention require comparatively lower force to impart plastic flow to the composition. The methods of the present invention are thus capable of providing a forming or shaping step which utilizes a relatively low amount of force to shape the product. This may be measured, for example, by the amount of head pressure and torque required to drive an extrusion process, each of which is also a characteristic by which the shapeability in general and the extrudablity in particular of the mass can be measured. In certain embodiments, the saccharide ester is preferably present in the composition in an amount effective to reduce the amount of shaping force, such as head pressure or extrusion torque, by at least about 10 percent, more preferably by at least about 20 percent, and even more preferably at least about 30 percent, relative to the shaping process being substantially the same except for the presence of saccharide ester.

The preferred methods of the present invention are thus capable of producing a shaped product, and particularly extruded, calendered and molded products, having greatly improved physical properties of the shaped product. For example one physical property that is preferably not degraded, and more preferably improved, is dimensional stability. Another physical property of the shaped product that is preferably not substantially degraded, and even more preferably improved, is deflection temperature under load (DTUL). As those skilled in the art are aware, DTUL is test which measures the resistance to distortion under a given load at elevated temperatures. The two common loads used are 0.46 MPa (66 psi) and 1.8 MPa (264 psi), although tests performed at higher loads such as 5.0 MPa (725 psi) or 8.0 MPa (1160 psi) are occasionally also used. The common ASTM test corresponding to DTUL is ASTM D 648, while the analogous ISO test is ISO 75.

Preferably the saccharide ester is present in the composition in an amount effective to improve at least one physical property, such as the dimensional stability of the shaped product or the DTUL, by at least about 1 percent, more preferably by at least about 2 percent, and even more preferably at least about 3 percent, relative to the physical property of the shaped product with all other conditions being substantially the same except for the presence of saccharide ester. Once again, while applicants do not intend to be bound by or to any particular theory, it is believed that the compositions and processes of the present invention are capable of achieving this desirable result at least in part because less energy, whether in the form of heat and/or pressure, is required to impart plastic flow to the shapeable mass of the present invention. Importantly, the preferred embodiments of the present invention achieve this advantageous decrease in shaping energy or force, which is an indication of shapeability, without any substantial sacrifice or deterioration in dimensional stability, and preferably also without any substantial decrease in tensile strength or DTUL, in the shaped product. Dimensional stability is assessed by observing the amount by which the shaped article expands during solidification after it emerges from the shaping process. Such expansion is sometimes referred to as swell, or in the case of extrusion, die swell. Relatively low shaping temperatures can be employed in accordance with the preferred methods of the present invention, and thus the shaped material preferably solidifies sooner after leaving the shaping apparatus, such as the die plate, the calendering rolls, or the mold. Furthermore, relatively low shaping pressures can be used in accordance with the preferred methods of the present invention, thereby resulting in a lowering of the residual elastic forces within the emerging article. It is believed that the reduction in the amount of energy which must be dissipated by expansion of the material upon emerging from the apparatus manifests as a desirable reduction in swell.

Preferably the saccharide ester is present in the composition in an amount effective to increase the gloss of the shaped product by at least about 5 percent, and in some embodiments an improvement of about 10 percent or more may be possible, relative to the dimensional stability of the shaped product with all other conditions being substantially the same except for the presence of saccharide ester.

As it emerges from the shaping orifice, conduit, nip, or cavity, the shaped product is preferably cooled to produce a relatively rigid article having the basic shape imparted by the shaping orifice, conduit or cavity. The shaped article can be used in its shaped form, for example, as a decorative molding, as fencing members, as siding for buildings, as pipe, as electrical conduit, as windows members, as door jambs, as base board, as flashing, as rigid sheet, as credit card stock, pipe parts and fittings, blister packs, and like products, and all such products produced by the present methods or using the present compositions are within the scope of the present invention. The shaped article also may be cut into convenient length pieces and packaged for use in follow-on processing, for example, as feedstock for further injection or blow molding processes.

In preferred embodiments involving extrusion, the present methods comprise providing an extrudable composition comprising at least one polyvinyl chloride resin and saccharide ester in an amount effective to improve, relative to the properties of the same composition but in the absence of saccharide ester (alone or combination with one or more synergistic coadditives), at least one measure of extrudability and/or measure of extrudate quality. Preferably, the methods of the present invention produce improvement in at least one measure of extrusion performance and in one measure of extrudate quality. More particularly, the present methods preferably exhibit improved performance in one or more of the following extrudability criteria: extrusion torque; head pressure; and processing stability. The present methods also preferably produce extruded articles which exhibit improvement in one or more of the following properties: surface gloss; dimensional stability; and tensile strength.

In preferred embodiments involving calendering, the present methods comprise providing a calenderable composition comprising at least one polyvinyl chloride resin and saccharide ester in an amount effective to improve, relative to the properties of the same composition but in the absence of saccharide ester, at least one measure of calenderability and/or measure of the quality of the shaped article. Preferably, the methods of the present invention produce improvement in at least the metal release properties of the shapeable composition, which is generally relevant to shapeability and particularly relevant to calenderability of the shapable composition, and/or also in one measure of calendered article quality, such as dynamic color stability.

In preferred embodiments involving molding, the present methods comprise providing a moldable composition comprising at least one polyvinyl chloride resin and saccharide ester in an amount effective to improve, relative to the properties of the same composition but in the absence of saccharide ester, at least one measure of moldability and/or measure of the quality of the shaped article. Preferably, the methods of the present invention produce improvement in at least one measure of molding performance and in one measure of shaped article quality, such as, for example, heat distortion under load.

The Compositions

The present invention provides shapeable compositions, additive compositions useful in the formulation of shapeable compositions, and shaped articles formed from the shapeable compositions of the present invention.

The Shapeable Compositions

The preferred compositions of the present invention exhibit improvement in at least one property indicative of the shapeability of the composition. For example, in certain embodiments the compositions of the present invention exhibit improvement in at least one of fusion torque, equilibrium torque, equilibrium temperature, processing stability (dynamic heat stability), and metal release. As mentioned above, these characteristics will generally result in improvements in the characteristics of methods involving extrusion, but it is believed that these properties will also be relevant to the shapeability in accordance with other shaping techniques, such as calendering, molding and the like. In other words, the inventors have found that inclusion of a saccharide ester, and preferably a saccharide stearate in which at least about 80% of the ester compounds are highly esterified, is beneficial generally to process performance. More specifically, it is preferred that the highly esterified compounds of the present invention have at least about 90%, and even more at least about 95% of the hydroxyl cites esterified. In the case of disaccharide esters, more preferably sucrose esters, and even more preferably sucrose stearates, it is therefore preferred that at least about 60% by weight of the compounds in the composition have at least 6 ester linkages, more preferably at least 7 ester linkages, and even more preferably 8 ester linkages.

It is believed that use of such preferred compounds in shapeable compositions, and preferably compositions comprising or consisting essentially of PVC-based resin, can provide compositions which display, in comparison to compositions that are substantially the same except for the lack of the preferred saccharide ester compounds, greater dynamic heat stability, lower head pressure, lower fusion torque, lower apparent viscosity and improved metal release properties, and with respect to the shaped products produced therefrom, improved dimensional stability, improved surface gloss, improved dynamic color stability and improved DTUL.

In addition to the resin and the saccharide ester, the present compositions may optionally include impact modifier, filler, heat stabilizer, processing aids, other lubricants, fillers, binders, colorants, and other processing aids, for example, those described in Handbook of Plastic Materials and Technology, Ed. I. Rubin, Wiley-Interscience, John Wiley & Sons, Inc. New York, 1990 and those described in Plastics Additives and Modifiers Handbook, Ed. J. Edenbaum, Van Nostrand Reinhold, New York 1992, Chapter 3.

Saccharide Esters

It is contemplated that esters, and particularly stearates, of all saccharides, including mono- and di-saccharides, are adaptable for use as a lubricant component in connection with the present invention. In highly preferred embodiments, the saccharide esters comprise or consist essentially of disaccharide esters, more preferably saccharide esters of fatty acids, and even more preferably disaccharide esters of fatty acids. Many methods are known and available for making or otherwise providing the saccharide esters of the present invention, and all such methods are believed to be available for use within the broad scope of the present invention. For example, in certain embodiments it may be preferred to that the fatty acid esters are synthesized by esterifying a saccharide, and preferably sucrose, with one or more fatty acid moieties obtained from the group consisting of soybean oil, commercial behenic acid, and commercial stearic acid (hereafter, sucrose "soyate", "behenate" and "stearate", respectively), and mixtures thereof. It may be preferred in other embodiments that stearate esters are synthesized by hydrogenating soyate esters. Other synthesis methods are available and are disclosed hereinafter.

Preferably, the preferred saccharide esters comprise a saccharide moiety, preferably a disaccharide moiety, and even more preferably a sucrose moiety, which has been substituted by an ester moiety at one or more of its hydroxyl hydrogens. Preferred disaccharide esters have the structure of Formula I.

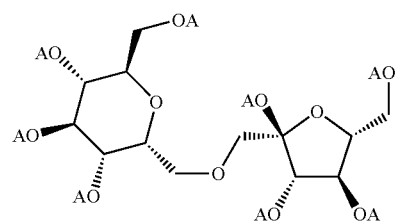

Formula I where "A" is hydrogen or of Structure I below:

Structure I where "R" is a linear, branched, or cyclic, saturated or unsaturated, aliphatic or aromatic moiety of about eight to about 40 carbon atoms, and wherein at least one "A," preferably at least six, more preferably at least seven, and even more preferably all eight "A" moieties of Formula I are in accordance with Structure I, particularly and preferably when Structure I is stearate or a derivate thereof.

Suitable "R" groups include any form of aliphatic moiety, including those which contain one or more substituents, which may occur on any carbon in the moiety. Also included are aliphatic moieties which include functional groups within the moiety, for example, an ether, ester, thio, amino or the like. Also included are oligomer and polymer aliphatic moieties, for example sorbitan, polysorbitan and polyalcohol moieties. Examples of functional groups which may be appended to the aliphatic or aromatic moiety comprising the "R" group include, but are not limited to, halogens, alkoxy, hydroxy, amino, ether and ester functional groups.

In general, the preferred disaccharide esters are sucrose esters in accordance with Figure I wherein the "R" groups are aliphatic and are linear or branched, saturated or unsaturated and have between about 8 and about 40 carbon atoms.

Most preferred are saccharide esters, preferably sucrose esters, in which the carboxyl groups are derived from fatty acids having between about eight and about 25 carbon atoms, for example, stearic acid ($CH_3(CH_2)_{16}C(O)OH$), behenic acid (docosanoic acid, ($CH_3(CH_2)_{20}C(O)OH$)), and the fatty aids derived from soybean oil, the latter composition being more fully described below. From among these, the sucrose stearate ester is highly preferred in many embodiments.

As used herein the terms "saccharide esters" and "sucrose ester" include compositions possessing different degrees of purity as well as mixtures of compounds of any purity level. For example, the sucrose ester compound can be a substantially pure material, that is, it can comprise a compound having a given number of the "A" groups substituted by only one species of Structure I moiety (that is, all "R" groups are the same and all of the sucrose moieties are substituted to an equal degree). It also includes a composition comprising a blend of two or more sucrose ester compounds, which differ in their degrees of substitution, but wherein all of the substituents have the same "R" group structure. It also includes compositions which are a mixture of compounds having differing degrees of "A" group substitution, and wherein the "R"

group substituent moieties are independently selected from two or more "R" groups of Structure I.

For compositions of the present invention, especially when substantially pure compounds are used, the composition will preferably be comprised of saccharide ester compounds, and even more preferably sucrose ester compounds, having a high degree of substitution.

Preferably, at least about 60 wt %, and even more preferably at least about 70 wt. % of the saccharide ester compounds are fully substituted with ester groups. In certain embodiments, at least about 80 wt %, more preferably at least about 90 wt %, and even more preferably at least about 95 wt. % of the saccharide ester compounds have are at least hexa-substituted, preferably with stearate moieties.

In general, it is believed that the degree of substitution at the A positions of Formula I with R groups will have an impact on the properties imparted to the compositions That is, the number of protons (1 to 8) in the "A" position that have been replaced with a moiety of Structure I is believed to be important to one or more of the properties of the composition, such as lubrication properties. In general, applicants have found that the performance improvement imparted to a shapeable PVC composition, in terms of processability and/or the properties of the shaped article, by a given mass of an added saccharide ester will increase as with increasing weight percentage of highly substituted, and even more preferably fully substituted, saccharide esters, preferably saccharide stearates, and even more preferably sucrose stearates.

For use in the compositions of the present invention, it is preferred to employ disaccharide esters, and preferably sucrose esters, which are highly substituted, and even more preferably fully substituted disaccharide esters. As used herein, the term "highly substituted" refers to compounds in which at least 6 "A" groups of the disaccharide moiety have a structure comprising a moiety of Structure I. Furthermore, the term "fully substituted" means that substantially all 8 "A" groups of the disaccharide moiety have a structure comprising a moiety of Structure I, sometimes also referred to herein for convenience as "octa-substituted" sucrose esters. The inventors have observed that the beneficial effects which sucrose esters impart to extrudable PVC compositions are maximized when a major proportion, and preferably at least about 90 wt % of the sucrose ester included in the composition is at least highly substituted, with at least 60 wt % preferably being octa-substituted. This is to say that for a composition comprising a given parts by weight of sucrose ester relative to the parts by weight of resin, preferably PVC resin, present in the extrudable composition, the improvement in extrusion properties of the composition generally increases as the degree of ester substitution increases Further, the inventors have observed also that the beneficial effects imparted to an extrudable PVC composition by the addition of a given weight of a pure aliquot of a less than highly or fully substituted sucrose ester increases non-linearly as the ester aliquot added comprises increasingly more substituted ester, with disproportionately larger gains observed for the highly substituted species. The beneficial effects on extrudable PVC compositions are maximized in certain embodiments when at least about 97 wt % of the saccharide esters are highly substituted (hexa-, hepta- or octa-substituted) sucrose esters, preferably sucrose sterates.

When mixtures of sucrose ester compounds are used, it is preferred that greater than about 50 wt. % of the ester compounds in the mixture are highly substituted, and even more preferably fully substituted disaccharide esters. In composition of the present invention it is preferred for the constituents of the disaccharide ester, preferably the sucrose ester, comprise at least about 70 wt. % of substituted ester moieties that are at least highly substituted, and even more preferably fully substituted.

One technique which can be used in certain embodiments to quantify the degree of ester substitution is to measure the hydrophilic/lipophilic balance (HLB value) of the compound. In preferred embodiments, the saccharide ester, and preferably the disaccharide ester, of the present compositions has an HLB value of less than less than about 6, preferably less than about 5, more preferably less than about 4, and even more preferably less than about 2. In certain highly preferred embodiments, the HLB value is not greater than about 1, indicating a very high degree of ester substitution in accordance with preferred embodiments of the present invention.

Factors to be considered in selecting a sucrose ester for inclusion in an extrudable PVC composition of the present invention include the length and degree of saturation of the "R" groups of the substituents moieties. Additional factors which may be considered include compatibility of the sucrose ester with other lubricants which may be present in the composition and the compatibility of the physical form of the sucrose ester with the processing conditions employed to make the extrudable PVC composition. For example, it may be more convenient to process a sucrose ester which is a solid rather than a liquid under ambient conditions.

Saccharide esters can be made by esterification with substantially pure fatty acids (for example, stearic acid to produce sucrose stearate) by known processes of esterification. They can be prepared also by trans-esterification using saccharide and fatty acid esters in the form of fatty acid glycerides derived, for example, from natural sources, for example, those found in oil extracted from oil seeds, for example soybean oil. Trans-esterification reactions providing sucrose esters using fatty acid glycerides are described, for example, in U.S. Pat. No. 6,504,003 to Trout et al. and U.S. Pat. No. 6,121,440 to Kenneally et al. In the Trout patent, Example I describes a trans-esterification reaction providing a sucrose ester in which 78 wt. % of the product esters are octyl-substituted esters (fully substituted), the balance of the product comprising a distribution of mono-, di-, tri-, tetra-, penta-, hexa-, and hepta-substituted sucrose esters.

As mentioned above, sucrose esters can be prepared by trans-esterification of sucrose from methyl ester feedstocks which have been prepared from glycerides derived from natural sources. As a consequence of the source of the fatty acids, the feedstock used to prepare the sucrose ester contains a range of saturated and unsaturated fatty acid methyl esters having fatty acid moieties containing between 12 and 26 carbon atoms. This will be reflected in the product sucrose esters made from such a source in that the sucrose moieties comprising the product will contain a mixture of ester moiety substituents, wherein, with reference to Structure I above, the "R" groups will be a mixture having between 12 and 26 carbon atoms with a ratio that reflects the feedstock used to prepare the sucrose ester. Further to illustrate this point, sucrose esters derived from soy bean oil will be a mixture of species, having "R" group structures which reflect that soybean oil comprises 26 wt. % triglycerides of oleic acid ($H_3C$—[$CH2$]$_7$—CH=CH—[$CH_2$]$_7$C(O)OH), 49 wt. % triglycerides of linoleic acid ($H_3C$—[$CH_2$]$_3$—[—$CH_2$—CH=CH]$_2$—[—CH2—]$_7$—C(O)OH), 11 wt. % of triglycerides of linolenic acid ($H_3C$—[—$CH_2$—CH=CH—]$_3$—[—$CH_2$—]$_7$—C(O)OH), and, 14 wt. % of triglycerides of various saturated fatty acids, as described in the Seventh Ed. Of the Merck Index, which is incorporated herein by reference. All of these fatty acid moieties are represented in the "R" groups of the substituents in the product sucrose ester.

Accordingly, when referring to a sucrose ester herein as the product of a reaction employing a fatty acid feed stock derived from a natural source, for example, sucrose soyate, sucrose behenate, and sucrose stearate, the term is intended to include all of the various constituents which are typically found as a consequence of the source from which the sucrose fatty acid ester is prepared.

In certain preferred embodiments of the present invention, the saccharide ester, and preferably the disaccharide ester, is formed from fatty acids having greater than about 12 carbon atoms, on average, more preferably from an average of from about 16 to about 20 carbon atoms, and even more preferably from about 16 to abut 18 carbon atoms, on average. In certain embodiments, it is further preferred that the fatty acids are substantially fully saturated fatty acids, and even more preferably substantially fully saturated fatty acids having the preferred number of carbon atoms in the chain as described above. For example, in preferred embodiments, the ester is sucrose stearate, and preferably highly substituted sucrose stearate, having no substantial unsaturation. Such a preferred product may be produced, for example, by hydrogenation of soyate esters. Such a preferred saturated stearate product has an advantage in certain embodiments over the unsaturated soyate in that the saccharide soyate product is typically in a liquid state under the conditions in which the shapeable composition is formed. This is a disadvantage in many embodiments because of the difficulty of processing such products in a cost effective and/or efficient manner.

For use in certain processes and compositions of the present invention, preferred sucrose esters are those synthesized by trans-esterification of sucrose with fatty acid glycerides obtained from soybean oil, or by trans-esterification with esters or glycerides derived from either behenic acid or stearic acid from natural sources, and mixtures thereof. Such sucrose esters are referred to herein as sucrose "soyate", sucrose "behenate" and sucrose "stearate", respectively.

For use in compositions of the present invention, sucrose stearate (sucrose esters esterified with stearic acid moieties) are especially preferred. It will be appreciated that commercially available stearic acid is a mixture of saturated and unsaturated-linear fatty acid species having between 12 and 18 carbon atoms in the aliphatic portion of the acid, referred to herein as a "stearyl" group. Preferred stearyl groups have from about 16 to about 18 carbon atoms in the aliphatic portion of the acid.

It will be appreciated also that other saccharides and polyfunctional alcohols can be esterified to provide ester lubricants which provide the volumetric density of fatty acid moieties afforded by the sucrose esters described above. Examples of these esters are the polyesters described in U.S. Pat. No. 6,504,003 to Trout et al. and U.S. Pat. No. 6,121,440 to Kenneally et al, which is incorporated herein by reference. It is contemplated that that the substitution of some or all of the sucrose esters in the compositions described above with the above-mentioned polyester lubricants will afford a composition having similarly improved dynamic processing improvements over extrudable PVC compositions which do not include any of the polyesters or the saccharide esters described above.

The amount of saccharide ester in the composition of the present invention can vary widely depending upon numerous factors, including the desired level of improvement in processing parameters and/or the particular characteristics desired of the extrudable PVC composition. In preferred embodiments, the present composition comprises from about 0.01 to about 2 parts by weight of saccharide ester, preferably sucrose ester, per 100 weight parts of resin in the composition (hereinafter, "parts per 100 wt. parts of resin" is abbreviated PHR). In other embodiments it is preferable that the composition contain from about 0.05 PHR to about 0.9 PHR of saccharide ester, preferably sucrose ester, more preferably from about 0.1 PHR to about 0.8 PHR and even more preferably from about 0.1 PHR to about 0.5 PHR.

The Resin

The compositions of the present invention may include thermoplastic resin or resins which exhibit thermoplastic properties or which are otherwise shapeable, preferably extrudable, and/or calenderable, and/or injection moldable, and/or compression moldable. Thus, it is contemplated that resins such as polycarbonates, ABS plastics and high engineering plastics may be used. It is generally preferred however, that the resin of the present compositions comprise, and preferably consist essentially of, vinyl based resin, that is, one or more polymers (including homopolymers, copolymers, terpolymers, etc.) that share the vinyl radical ($CH_2=CH$) as a starting structural unit. Particularly preferred is polyvinyl chloride (PVC), and in particular suspension, dispersion, emulsion or bulk PVC resins, with suspension and bulk PVC resins being preferred. In preferred embodiments, the PVC resin of the present invention has a Filentscher K-value of from about 50 to about 70, and even more preferably form about 55 to about 65.

Additives

As mentioned above, shapeable compositions of the present invention may include also other additives typically included in shapeable compositions, preferably PVC resin, as described above, including those additives which have heat-stabilizing properties and including also those which have internal and external lubricant properties. Herein, these are termed "supplemental" to distinguishing them from the saccharide esters of the invention which also have lubricating and/or co-stabilizing properties. It should be noted, however, that the reference to such additional lubricants and/or stabilizers as "supplemental" should not be interpreted as meaning that the additional lubricant and/or stabilizer necessarily has less lubricating or stabilizing functionality than the present compositions. In fact, it is contemplated that in certain embodiments the "supplemental" lubricant and/or stabilizer will have functionality equivalent to or greater than the compositions of the present invention. Accordingly, the amount of saccharide ester employed can be adjusted according to amount of supplemental lubricants, stabilizers, etc. in the composition in accordance with known principles.

The shapeable compositions of the present invention may be prepared by any known means of blending solid or semi-solid materials with other solid, semi-solid, or liquid materials. Any type of mixing or blending equipment on a scale from manual laboratory bench top scale, for example a hand-held motorized mixer and vessel, to motorized industrial scale processing equipment can be used. Examples of the latter type of equipment include a Henschel mixer and a ribbon blender.

Conveniently, a shapeable composition can be prepared by placing a weighed amount of resin, preferably a polyvinyl chloride resin (PVC resin) into a blending apparatus, adding in turn the desired secondary additive constituents, for example, stabilizers, fillers, processing aids, colorants, and pigments, and other ingredients desired in the composition, and adding to the mass either before, during or after the addition of the above noted other additives, the amount of one or more saccharide esters preferably being equivalent to between about 0.01 and about 2 PHR.

Additive Compositons

The present invention provides also additive compositions. In one embodiment, additive compositions of the invention are formulated to be added to a composition comprising a shapeable resin, preferably PVC resin, optionally with other additives, to provide a shapeable composition of improved processing and/or shaped article properties, as defined herein.

In general, an additive composition can comprise any of the additives described above. Supplemental-internal and external lubricants, heat stabilizers, and other constituents of shapeable PVC compositions and the variables governing the selection and amounts of these supplemental additives used in extrudable PVC compositions are described generally in the Plastics Additives and Modifiers Handbook, Ed. J. Edenbaum, Van Nostrand Reinhold, New York 1992, which portions are incorporated herein by reference. Preferred additive compositions comprise at least one saccharide ester and at least one member of the group consisting of compatible supplemental lubricants and compatible heat stabilizers.

For example, in one embodiment, an additive composition of the present invention may be formulated to comprise all of the constituents, except for a PVC resin, which comprise a shapeable PVC composition. An additive composition of this type is formulated to be mixed with only a PVC resin and thereby provide a shapeable PVC composition of the present invention. In an alternative embodiment, an additive composition may be formulated to be added to a shapeable PVC composition as one of many additive constituents used to prepare the shapeable composition. In the latter embodiment, it is preferred for an additive composition to comprise at least some of the most common constituents of shapeable PVC compositions, thereby providing a single additive composition which can be used in a number of different shapeable PVC compositions while reducing the number of addition processes required to prepare a shapeable PVC composition.

It is contemplated that a wide variety of components over a wide range of relative ratios will be adaptable for use in the present invention in view of the teachings contained herein. Furthermore, it is believed that the teachings contained herein will allow a person skilled in the art to readily determine if a particular shapeable composition additive is compatible with a particular saccharide ester.

The additive compositions of the present invention may be prepared by any known means for admixing solid, semi-solid, or liquid materials with other solid, semi-solid, or liquid materials, including techniques used for the admixture of miscible materials, for example a mixture of two or more components forming a single phase, and techniques used for blending phase separated materials to form an intimate interpenetrating structure of domain-separated regions of two or more immiscible or partially immiscible materials. Any type of mixing or blending equipment on a scale from manual laboratory bench top scale, for example a hand-held motorized mixer and vessel, to motorized industrial scale processing equipment can be used. Examples of the latter type of equipment include a standard mixer and a temperature controlled agitated blend tank. It will be appreciated that the additive composition of the present invention may be prepared as a separate composition for admixture with a shapeable PVC composition of the type described above. Alternatively, each and severally, the constituents of the additive composition may be added either simultaneously or sequentially to the PVC composition without first blending them together. Additionally, when added as a series of components to a PVC composition, it will be appreciated that the order of addition is generally not critical. In certain embodiments, however, it is preferred that the components be added in the following sequence: resin; stabilizer; lubricant; processing aid; impact modifier; filler; and others.

Examples of supplemental internal lubricants which are preferred for use in the preparation of lubricant-based additive compositions include metallic soaps, for example calcium stearate, and fatty acid ester waxes known to be internal lubricants, for example distearyl phthalate. Examples of supplemental external lubricants preferred for use in the preparation of lubricant-based additive compositions include: hydrocarbon waxes, for example, paraffin waxes, Fischer-Tropsch waxes, alpha olefins, microcrystalline waxes and the like; amide waxes, for example, ethylene bis (stearamide) wax; polyethylene waxes, for example, A-C® 6A (Honeywell); and oxidized low and high density polyethylene waxes, for example, A-C® 629 A (low density) A-C® 316A (high density), each of which are available from Honeywell. In preferred embodiments, the additive compositions comprise saccharide ester, preferably sucrose ester, and a supplemental lubricant selected from the group consisting of paraffin wax lubricants, oxidized polyethylene lubricants, and combinations of these. For additive compositions which contain a paraffin lubricant, it is preferred in certain embodiments that calcium hydroxide and a fatty acid are included also in the composition. Alternatively, the composition may include instead the direct addition of a fatty acid salt.

Certain preferred additive compositions comprise, and in certain embodiments consist essentially of, sucrose ester and wax lubricant, for example, Rheolub® 165 Paraffin Wax (Honeywell). Such preferred additive compositions preferably comprise about 1 wt. % to about 50 wt. % saccharide ester, more preferably from about 5 wt. % to about 30 wt. % of saccharide ester, and even more preferably from about 5 wt. to about 25 wt % of to saccharide ester, with sucrose esters being generally preferred for use. The compositions preferably comprise from about 1 wt. to about 99 wt. % wax lubricant, more preferably from about 20 wt. % to about 85 wt. % wax lubricant, and even more preferably from about 30 wt. % to about 80 wt. % of wax lubricant, with paraffin wax lubricants being generally preferred for use.

In certain embodiments, the additive compositions comprise, and in certain preferred cases consisting essentially of, saccharide ester (preferably sucrose ester and preferably the highly or fully substituted sucrose esters described above), and oxidized polyethylene lubricant, for example A-C 629® (Honeywell), preferably comprise from about 1 wt. % to about 99 wt. % saccharide ester, more preferably from about 9 wt. % to about 56 wt. % of saccharide ester, and from about 1 wt. % to about 75 wt. % oxidized polyethylene lubricant, and even more preferably from about 7 wt. % to about 45 wt. % oxidized polyethylene lubricant.

In general, when an additive composition comprises a blend of one or more paraffin wax lubricants with one or more oxidized polyethylene lubricants, the composition preferably comprises: (a) from about 5 wt. % to about 86 wt. % sucrose ester, more preferably from about 7 wt % to about 20 wt % sucrose esters; from about 10 wt. % to about 90 wt. % paraffin wax lubricant, more preferably from about 30 wt. % to about 70 wt. % paraffin wax lubricant; and from about 5 wt. % to about 20 wt. % polyethylene lubricant, more preferably from about 7 wt. % to about 15 wt. % oxidized polyethylene lubricant.

When a paraffin wax lubricant is present, with or without additional lubricants, the additive composition optionally but preferably includes calcium hydroxide and/or calcium oxide and fatty acid, for example, stearic acid. In general, the weight ratio of calcium oxide/hydroxide:fatty acid is preferably from about 1:4 to about 1:10, more preferably about 1:7 to 1:10, and even more preferably about 1:9. Preferably the combined amount of calcium hydroxide and fatty acid in the composition is up to about 1.1 times the amount on a weight basis of the remaining constituents of the additive composition, and even more preferably in an amount of from about 0.02 times to about 1 times the combined weight of the other constituents of the composition.

In general, when the composition contains fatty acid and calcium hydroxide constituents, the composition is preferably prepared by blending together a wax in liquid form, a fatty acid and calcium hydroxide, followed by a reaction step carried out under conditions in which at least a portion of the fatty acid is neutralized and optionally an additional portion is esterified, as dictated by art-recognized variables with regard to the properties desired in the extrudable PVC composition into which the finished additive composition is to be blended. Preferably, the mixing and temperature conditions attained during the blending of the constituents of additive compositions which include a fatty acid and calcium hydroxide are adjusted to insure that the neutralization reaction between the hydroxide and the acid proceeds substantially to completion. Following this, any additional internal or external lubricants to be included in the composition are preferably sequentially melt-blended into the mass and any other additives or processing additives to be included are added. The mass is then preferably filtered and processed by known means to render it into a form suitable for use as an additive, for example, prilling, flaking, pastelation, and slabbing.

As described above, alternatively to the addition of calcium hydroxide and a fatty acid to an additive composition, a fatty acid salt, for example, calcium stearate, may be added to the composition in an amount up to about 1.1 times on a weight basis the combined weight of the other constituents in the composition. In general, if the additive composition includes a fatty acid salt, the constituents are preferably dry-blended in accordance with the principles described herein.

As mentioned above, an additive composition can be prepared which consists essentially of at least one sucrose ester and at least one constituent comprising a supplemental heat-stabilizing additive which is not a saccharide ester in accordance with the claimed inventions. It will be appreciated that the same processes described above for the preparation of lubricant-based additive compositions can be employed in the preparation of heat stabilizer-based additive compositions. A supplemental heat stabilizer is preferably included in the compositions of the present invention, and even more preferably the present compositions include a supplemental heat stabilizer having a greater stabilizing functionality than the saccharide ester of the present invention.

In general, the supplemental heat stabilizers exert a dynamic heat-stabilizing effect when added to an extrudable PVC composition. Examples of such supplemental heat stabilizers suitable for use in the preparation of additive compositions include those generally used as heat stabilizing additives in extrudable PVC compositions, for example, compounds containing tin, for example, tin mercaptides. Other art-recognized heat stabilizers, for example, those described generally in the *Plastics Additives and Modifiers Handbook*, Ed. J. Edenbaum, Van Nostrand Reinhold, New York 1992 (which are incorporated herein by reference), for example, those based on lead-based compounds, for example, neutral lead stearate and dibasic lead phosphate, may be used also. Additionally, "mixed-metal" soaps may be used, for example calcium/zinc stearates. Additionally, heat stabilizers which are not based on heavy metal salts may be used, for example, organic-based stabilizers (OBS) from Crompton Corporation. It has heretofore been know to include as a stabilizer the epoxidation products of fatty acids, and it is possible that such stablilizers may be incorporated into the compositions of the present invention in certain embodiments. However, applicants have discovered that in certain embodiments that present compositions do not include any substantial amount, and more preferably not a stabilizing amount, of epoxidation products of fatty acids. It will be appreciated that, as for the additive compositions based on art-recognized lubricants described above, additive compositions based on art-recognized heat stabilizers may include additionally, any of the other additive constituents typically incorporated into extrudable PVC compositions.

In each of the additive compositions described above, the saccharide or sucrose esters are preferably the highly or fully esterified saccharide esters described above, and even more preferably the highly or fully esterified saccharide stearates described above.

The following examples are presented for the purpose of illustrating the forgoing description and are not meant to limit the scope of the claimed invention.

EXAMPLES

Examples 1, 1CA and 1CB—Extrusion

A PVC resin-containing extrudable composition of the present invention (Example 1) and two similar compositions, prepared with the same constituents, but substituting the sucrose ester lubricant for a known external lubricant (Comparative Example C1A) and a known internal lubricant (Comparative Example C1B) are presented below.

The compositions are prepared by charging the constituent components into a Waring Blender (high intensity mixer) and heating to a temperature in excess of 105° C. while operating the mixing blades. When the components are homogeneously blended, the composition is discharged, cooled to ambient temperature and left to stand for 24 hours (aging period).

At the end of the aging period a 68 g sample of the composition is placed into a Brabender torque rheometer and subjected to rheometric analysis. As described above, each composition is subjected to rheometric analysis of the fusion and stability time, equilibrium and fusion torque and equilibrium temperature according to ASTM standard testing procedure D2538. Using this procedure, comparison of the stated rheometric properties is made between a composition of the present invention (Example 1) and the two comparative example compositions, comparative Example C1A (containing an external lubricant in lieu of the sucrose ester lubricant) and comparative Example C1B (containing an internal lubricant in lieu of the sucrose ester lubricant). The results of these determinations are presented in Table E1 and discussed below.

The materials used to prepare the various example and comparative example compositions were as follows: 1091® polyvinyl chloride resin (resin) from Georgia Gulf; TM281® tin based heat stabilizer (stabilizer) from Rohm & Haas; Rheolub® 165 paraffin wax (paraffin wax) from Honeywell, COAD 10 calcium stearate (calcium lubricant) from Norac; A-C® 629 oxidized polyethylene wax from Honeywell (polymer wax); Paraloid K120N® acrylic processing aid (processing aid) from Rohm & Haas; Paraloid KM334® acrylic impact modifier (impact modifier) from Rohm & Haas; UFT® calcium carbonate from OMYA (calcium carbonate); titanium dioxide ($TiO_2$), stearyl stearate (ester lubricant "a"), and distearyl phthalate (ester lubricant "b") are articles of commerce; and sucrose stearate (ester lubricant "c") was obtained from Procter & Gamble. All materials were used as received.

Two comparative examples and one example composition were prepared as described above using the materials described, in the amounts described in Table E1A, below.

TABLE E1A

| | Wt. Parts relative to 100 weight parts resin | | |
| --- | --- | --- | --- |
| | Comparative Example | | |
| Constituent | C1A | C1B | Example 1 |
| Resin | 100 | 100 | 100 |
| Stabilizer | 0.8 | 0.8 | 0.8 |
| Paraffin wax | 1 | 1 | 1 |
| Polymer wax | 0.15 | 0.15 | 0.15 |
| Calcium lubricant | 1.1 | 1.1 | 1.1 |
| Processing aid | 1 | 1 | 1 |
| Impact modifier | 4 | 4 | 4 |
| Calcium carbonate | 5 | 5 | 5 |
| TiO$_2$ | 8 | 8 | 8 |
| Ester lubricant | 0.5$^a$ | 0.5$^b$ | 0.5$^c$ |

$^a$lubricant is stearyl stearate
$^b$lubricant is distearyl phthalate
$^c$lubricant is sucrose stearate The compositions thus prepared are subjected to rheological analysis as described above. In carrying out the analysis, the rheometer bowl temperature is set at 180° C. and the rotor speed is set to 80 rpm. The results of this analysis are presented in Table E1B, below.

TABLE E1B

| Parameter | Comparative Example C1A | Comparative Example C1B | Example 1 |
| --- | --- | --- | --- |
| Equilibrium Temp (° C.) | 213 | 214 | 198 |
| Fusion Torque (g.m) | 3,150 | 3,500 | 2,750 |
| Equilibrium Torque (g.m) | 2,000 | 2,000 | 1,750 |
| Fusion Time (sec) | 60 | 45 | 60 |
| Stability time* | 9 | 8 | 12 |

*elapsed time between fusion and measurable onset of cross-linking (minutes)

These data show that a PVC resin-containing composition which includes a sucrose ester lubricant possesses rheological properties which are superior to compositions containing only art-recognized lubricants (comparative Examples A & B). The reduction by the sucrose ester in equilibrium temperature and torque compared with the internal lubricant suggests that the sucrose ester lubricant performs, in part, in the manner of an internal lubricant. It also indicates that the sucrose ester provides superior apparent viscosity reduction to that afforded by the known distearyl phthalate internal lubricant.

These data also show that the composition of the present invention displays a reduction in fusion torque without a concomitant increase in fusion time when compared to the stearyl stearate external lubricant. This suggests that the sucrose ester performs, in part, as external lubricant with properties superior to stearyl stearate.

Table 1B also indicates that the processing properties of the present invention composition (which contains sucrose ester) are improved over, and the dynamic heat stability exceeds that of, the prior art compositions which contain only secondary lubricants adjusted to provide similar levels of lubricating properties. It is expected from these data that the compositions of the present invention will require less extruder torque and/or less extruder head pressure for the same rate of extrusion of the PVC composition when compared to the compositions of the comparative examples. It is also expected that the compositions of the present invention will provide an extruded article having superior surface gloss by virtue of the superior external lubricant performance afforded by the sucrose ester compositions over compositions containing only the art-recognized external lubricants. As mentioned above, the data in Table IB indicates also that the present compositions exhibit increased the dynamic heat stability, as indicated by the increase in heat stability time.

Examples 2-8—Additive Compositions

Seven (7) additive compositions are prepared comprising: (i) a sucrose ester and paraffin wax lubricant (Example 2); (ii) a sucrose ester and an oxidized polyethylene lubricant (Example 3); (iii) sucrose ester, paraffin wax lubricant, and an oxidized polyethylene lubricant (Example 4); (iv) sucrose ester, paraffin wax lubricant, calcium hydroxide and stearic acid (Example 5); (v) sucrose ester, oxidized polyethylene lubricant, paraffin wax lubricant, calcium hydroxide and stearic acid (Example 6); (vi) a sucrose ester, a paraffin wax lubricant, and calcium stearate (Example 7); (vii) a sucrose ester, an oxidized polyethylene lubricant, a paraffin wax lubricant, and calcium stearate (Example 8); and (viii) sucrose stearate and an OBS heat stabilizer (Example 9). In all of the example preparations, the sucrose stearate referred to is an article of commerce obtained from Procter and Gamble, the paraffin wax referred to is RL-165-010® (Honeywell), the oxidized polyethylene wax referred to is AC®-629 (Honeywell), the calcium hydroxide referred to is an article of commerce, and the stearic acid referred to is commercial grade material from Proctor & Gamble.

In the following examples, melt blending refers to placing the paraffin and polyethylene constituents of the composition into a blend tank and heating to about 132° C. The constituents are blended for about one hour, with the time being adjusted as needed to provide a homogeneous admixture of the materials. When the paraffin and polyethylene constituents are homogeneous, the sucrose stearate is first added, followed by the addition to the mass, each in turn, of any remaining of the constituents. When the composition involves the preparation of an acid salt, by blending a base and a fatty acid into the composition, blending is continued until the desired acid number is reached. As each constituent is added to the vessel, blending is carried out for about 15 minutes between additions and for an additional one hour period following the addition of the last constituent. The blended material is then filtered through a bag filter and prilled.

As noted in some examples, a dry blending procedure will be used. The dry blending procedure comprises placing the sucrose ester and the other constituents of the composition into a ribbon blender under ambient conditions and blending the constituents for a period which is sufficient to provide intimate admixture of the constituents. Typically this is achieved after about 30 minutes blending time.

As mentioned in each example, the improved extrusion properties expected by adding the indicated amount of the composition to an extrudable PVC composition include a reduction in the head pressure and/or extrusion torque necessary to extrude the PVC composition with which the additive composition is blended, and/or an increase in the dynamic heat stability of the PVC composition, and/or an increase in the surface gloss of an extruded article comprising the blend.

Example 2

An additive composition is prepared by melt-blending, at a temperature of about 132° C., 9 g of sucrose stearate and 33.1 g of paraffin wax in accordance with the above-described procedure. It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example 3

An additive composition is prepared by melt-blending, at a temperature of about 132° C., 9 g of sucrose stearate and 7.2 g oxidized polyethylene wax in accordance with the above-described procedure. It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example 4

An additive composition will be prepared by melt-blending, at a temperature of about 132° C., 9 g of sucrose stearate, 33.1 g of paraffin wax, and 7.2 g oxidized polyethylene wax in accordance with the above-described procedure. It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example 5

An additive composition is be prepared by melt-blending, at a temperature of about 132° C., 9 g of sucrose stearate and 33.1 g paraffin wax (Honeywell) according to the above-described procedure. After about 15 minutes of blending the wax and sucrose stearate, about 5.1 g of calcium hydroxide and 45.6 g of stearic acid is added to the mixture. The mixture is heated to about 155° C. and held at a temperature of at least 150° C. with continued blending until the mixture titrates to give an acid number of between 22 and 24 g KOH/g of mixture.

When an amount of this composition sufficient to provide about 0.1 wt. parts of sucrose ester PHR of the PVC resin contained in an aliquot of an extrudable PVC composition is blended with the PVC composition it is expected that in improvement in extrusion processing properties of the extrudable PVC composition will be observed.

Example 6

An additive composition will be prepared by adding to 49.3 g of an additive composition prepared according to Example IV, 5.1 g of calcium hydroxide and 45.6 g of stearic acid according to the procedure described for Example V.

When an amount of this composition sufficient to provide about 0.1 wt. parts of sucrose ester PHR of the PVC resin contained in an aliquot of an extrudable PVC composition is blended with the PVC composition it is expected that in improvement in extrusion processing properties of the extrudable PVC composition will be observed.

Example 7

An additive composition is be prepared by dry-blending 9 g of sucrose stearate and 33.1 g of paraffin wax under ambient conditions in a ribbon blender under ambient conditions in accordance with the above-described dry-blending procedure. After the initial blending period, 50 g of calcium stearate are added to the mixture followed by an additional blending period of about 1 hour.

It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example 8

An additive composition is prepared by dry-blending 9 g of sucrose stearate, 33.1 g of paraffin wax, and 7.2 g of oxidized polyethylene wax under ambient conditions in a ribbon blender according to the procedure described above. After the initial blending period, 50 g of calcium stearate are added to the mixture followed by an additional blending period of about 1 hour.

It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Next is described an additive composition comprising a art-recognized heat stabilizer and sucrose stearate.

Example 9

An additive composition is prepared by dry-blending 9 g of sucrose stearate and 5 g of a lead stabilizer, such as Mark A 70® (an OBS heat stabilizer, Crompton Corporation, used as received) under ambient conditions in accordance with the above-described dry-blending procedure. Blending will be carried out until a homogeneous admixture is provided.

It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example 10—Compression Molding

Two PVC resin-containing compositions shapeable by compression molding in accordance with the present invention (Examples 10A and 10B) are prepared, each at a different loading of a sucrose ester lubricant of the present invention. Each composition is prepared by charging the constituent components into a 2 roll mill operated at roll temperature of 190C, a speed of 20/30 RPM, a nip of 0.006 inch, for a period of six (6) minutes. The components are thereby homogeneously blended to form a shapeable composition, which is then discharged, cooled to ambient temperature and left to stand for 24 hours (aging period).

At the end of the aging period a 68 g sample of the composition is first pre-heated for 5 minutes, then placed into a compression mold operated with a platen temperature of 390F and a compression of 15 tons for a period of three (3) minutes. The shaped composition is then ejected from the mold and allowed to cool. The shaped product is then tested to determine physical properties, including tensile strength, tensile modulus and heat distortion under load (based on a temperature rise of 2 degrees per minute and a load of 0.45 N/mm$^2$). The results of these determinations are presented in Table EI0 and discussed below.

The materials used to prepare the example compositions were as follows: K65® polyvinyl chloride resin (resin) from Shintech; Thermolitee tin based heat stabilizer (stabilizer) from Arkema; Durastrength® 200 acrylic impact modifier (impact modifier) from Arkema; titanium dioxide (TiO$_2$); UFT® calcium carbonate from OMYA (calcium carbonate); Paraloid K120N® acrylic processing aid (processing aid) from Rohm & Haas; Paraloid K175® lubricating acrylic processing aid (lubricating processing aid) from Rohm & Haas; COAD 10® calcium stearate (calcium lubricant) from Norac; Rheolub® 165 paraffin wax (paraffin wax) from Honeywell; A-C® 316A oxidized polyethylene wax from Honeywell (polymer wax); and sucrose stearate (obtained from Procter & Gamble). All materials were used as received.

Two compositions were prepared as described above, with one composition containing the sucrose ester lubricant in an amount of 0.25 parts by weight per hundred parts resin (Example 10A) and with the other composition containing the sucrose ester lubricant in an amount of 0.75 parts by weight per hundred parts resin (Example 10B). The results are described in Table E10A below.

TABLE E10A

|  | Wt. Parts relative to 100 weight parts resin Example | |
| --- | --- | --- |
| Constituent | 10A | 10B |
| Resin | 100 | 100 |
| Stabilizer | 1.5 | 1.5 |
| Impact modifier | 4.5 | 4.5 |
| TiO$_2$ | 9 | 9 |
| Calcium carbonate | 5 | 5 |
| Processing aid | 0.5 | 0.5 |
| Lubricating Processing Aid | 0.5 | 0.5 |
| Calcium lubricant | 0.75 | 0.75 |
| Paraffin wax | 0.6 | 0.6 |
| Polymer wax | 0.1 | 0.1 |
| sucrose stearate lubricant | 0.25 | 0.75 |

The results of the physical property analysis performed on the shaped product in accordance with this Example 10 are presented in Table E10B, below.

TABLE E10B

|  | Example 10A | Example 10B |
| --- | --- | --- |
| Lubricant Loading, PHR Parameter | 0.25 | 0.75 |
| Tensile Strength (psi) | 6313 | 6209 |
| Modulus (psi) | 402,000 | 388,000 |
| Avg. Heat Distortion (° C.)* | 73.7 | 74.4 |
| Izod Impact Strength (ft-lb./in.) | 3.792 | 4.018 |

*based on three tests

These data show that a shaped PVC resin-containing composition formed from a composition containing sucrose ester lubricant exhibits physical properties, particularly heat distortion under load, which is typically measured as deflection temperature or deflection temperature under load (DTUL), which improves to a significant extent as the loading of the lubricant increased. More particularly it is seen that the DTUL increases, on average, approximately 0.7C. This is surprising since for most lubricants the DTUL would be expected to either remain substantially unchanged or actually deteriorate as lubricant loading is increased. This result is potentially highly desirable since it can permit the use of relatively high lubricant loadings in accordance with the present invention, which will enhance the processing characteristics of the shapeable composition, while at the same time actually increasing one or more of the physical properties of the shaped product. This result is especially unexpected since higher loadings of prior lubricants would at best have no impact on DTUL, as illustrated in the comparative examples which follow.

Comparative Examples C10A, C10B, C10C—Compression Molding

The procedure of Example 10 is repeated except that the sucrose ester lubricant is replaced by a lubricant with primarily internal functionality (Comparative Example C10A) and two lubricants appearing to having varying degrees of external lubricant functionality (Comparative Examples CL0B and C10C). The internal lubricant is distearyl phthalate (lubricant "a"), and the two external lubricants are pentaerythritol adipate stearate (lubricant "b") and dipentaerythritrol hexa stearate (lubricant "c").

Each of the lubricants was used at the same two loadings described above in Example 10, namely 0.25 and 0.75 PHR, and the results of the physical property testing are provided in Table CE10A below.

TABLE CE10A

|  | Comparative Example C10A | | Comparative Example C10B Lubricant | | Comparative Example C10C | |
| --- | --- | --- | --- | --- | --- | --- |
|  | distearyl phthalate | | pentaerythritrol adipate stearate | | dipentaerythritrol hexa stearate | |
| Loading | 0.25 | 0.75 | 0.25 | 0.75 | 0.25 | 0.75 |
| Tensile Strength (psi) | 6370 | 6314 | 6289 | 6235 | 6277 | 6176 |

TABLE CE10A-continued

|  | Comparative Example C10A | | Comparative Example C10B Lubricant | | Comparative Example C10C | |
|---|---|---|---|---|---|---|
|  | distearyl phthalate | | pentaerythritrol adipate stearate | | dipentaerythritrol hexa stearate | |
| Modulus (Mpsi) | 408 | 414 | 398 | 409 | 403 | 399 |
| Average Heat Distortion (° C.)* | 72.9 | 72.4 | 73.2 | 73.4 | 73.5 | 73.7 |
| Izod Impact Strength (ft-lb./in) | 3.47 | 3.532 | 3.537 | 4.03 | 3.696 | 4.28 |

*based on three tests

These data show that certain PVC resin-containing compositions formed from a composition containing typical prior lubricants exhibit physical properties, particularly hear distortion under load (DTUL) properties, which do not improve to any significant extent as the loading of the lubricant increased. More particularly it is seen that the DTUL for the internal lubricant distearyl phthalate (Example C10A) and for one of the external lubricants—dipentaerythritrol hexastearate (Example C10C)—is essentially unchanged as the loading of the lubricant increases. Perhaps more importantly the second of the internal lubricants—distearyl phthalate (Example C10C)—actually produces what may be considered a significant deterioration in DTUL as loading increases. Thus, in contrast to the present invention, the improved processing properties associated with high loading of this lubricant come only at the expense of a substantial deterioration of DTUL.

Example 11—Extrusion

Two PVC resin-containing compositions shapeable by extrusion in accordance with the present invention (Example 11) are prepared as in Example 10 except that a two roll mill is not used to form the shapeable composition. Rather, the components as identified in Table E10A are charged into a Waring Blender (high intensity mixer) and heated to a temperature in excess of 105° C. while operating the mixing blades. When the components are homogeneously blended, the composition is discharged, cooled to ambient temperature and left to stand for 24 hours (aging period).

At the end of the aging period a 68g sample of the composition is placed into a Brabender torque rheometer and subjected to rheometric analysis. As described above, each composition is subjected to rheometric analysis of the fusion and stability time, equilibrium and fusion torque and equilibrium temperature according to ASTM standard testing procedure D2538. The results of these determinations are presented in Table E11A and discussed below.

TABLE E11A

|  | Example 11A | Example 11B |
|---|---|---|
| sucrose ester, PHR | 0.25 | 0.75 |
| Fusion Conditions | | |
| Fusion Time (min.) | 2.23 | 5.73 |
| Fusion Torque (m-g) | 2843 | 1794 |
| Equilibrium Temp (° C.) | 198 | 191 |
| Equilibrium Torque (m-g) | 2243 | 1593 |
| Amps | 11 | 7 |
| Melt Pressure (psig) | 1500 | 1400 |
| Melt Temperature (F.) | 170 | 170 |

The data in Table 11A show that even at low loading levels of sucrose ester the compositions in accordance with the present invention have exceptionally beneficial effect on processing conditions. For example at the low loading level of 0,25 PHR, the fusion time and the fusion torque are both indicative of very effective functionality. Moreover, it is seen that increased loadings (from 0.25 to 0.75 PHR) has a substantial effect on fusion conditions indicative of excellent functionality as an external lubricant, namely, increased fusion delay, reduced fusion and equilibrium torque, and reduced amps and pressure.

The shaped article produced in each sample is then tested for physical properties, including VHIT impact resistance, Izod impact energy, and Izod impact strength. The results of these determinations are presented in Table E11B and discussed below.

TABLE E11B

|  | Example 11A | Example 11B |
|---|---|---|
| sucrose ester, PHR | 0.25 | 0.75 |
| Physical Properties | | |
| VHIT Impact Resistance (in-lb/mil) | 3.9 | 1.0 |
| Izod Impact Energy (ft-lb) | 0.4945 | 0.5303 |
| Izod Impact Strength (ft-lb./in.) | 3.792 | 4.018 |

This data reveals that at low loadings the sucrose ester of the present invention provides excellent physical properties in the extrudate, particularly impact resistance. As can be seen from the comparative examples below, the impact resistance in this case is comparable even to compositions which do not contain a lubricant with any substantial external functionality.

Comparative Examples C11A, C11B, C11C—Extrusion

The procedure of Example 11 is repeated except that the sucrose ester lubricant is replaced by a lubricant with primarily internal functionality (Comparative Example C11A) and two lubricants appearing to having varying degrees of external lubricant functionality (Comparative Examples C11B and C11C). The internal lubricant is distearyl phthalate (lubricant "a"), and the two external lubricants are pentaerythritrol adipate stearate (lubricant "b") and dipentaerythritrol hexa stearate (lubricant "c").

Each of the lubricants was used at the same two loadings described above in Example 10, namely 0.25 and 0.75 PHR, and the results of the physical property testing are provided in Table CE11A below.

TABLE CE11A

|  | Comparative Example C11A | | Comparative Example C11B Lubricant | | Comparative Example C11C | |
|---|---|---|---|---|---|---|
|  | distearyl phthalate | | pentaerythritrol adipate stearate | | dipentaerythritrol hexa stearate | |
| Loading | 0.25 | 0.75 | 0.25 | 0.75 | 0.25 | 0.75 |
| Fusion Conditions | | | | | | |
| Fusion Time (min:sec) | 1:14 | 1:34 | 1:32 | 2:20 | 1:46 | 3:50 |
| Fusion Torque (Nm) | 33.3 | 32.2 | 32.4 | 27.6 | 30 | 22.1 |
| Fusion Temp. (° C.) | 181 | 181 | 180 | 183 | 183 | 184 |
| Equilibrium Temp (° C.) | 203 | 202 | 203 | 198 | 202 | 194 |
| Equilibrium Torque (Nm) | 22.1 | 21.4 | 22.0 | 21.4 | 21.4 | 18.7 |
| Extrusion Properties | | | | | | |
| Amps | 20 | 18 | 17 | 10 | 13 | 8 |
| Melt Pressure (psig) | 2000 | 2000 | 2000 | 1600 | 1800 | 1400 |
| Melt Temperature (FC) | 170 | 170 | 170 | 170 | 170 | 170 |
| Physical Properties | | | | | | |
| VHIT Impact Resistance (in-lb/mil) | 4.0 | 4.0 | 3.6 | 2.4 | 3.3 | 1.4 |
| Izod Impact Energy (ft-lb) | 0.4646 | 0.4699 | 0.47 | 0.525 | 0.4842 | 0.5435 |
| Izod Impact Strength (ft-lb./in.) | 3.470 | 3.532 | 3.537 | 4.031 | 3.696 | 4.28 |

The data above reveal that none of these compositions performed as well as the composition of the present invention with respect to fusion torque, at either high or low loadings. More particularly, at low loadings the lowest fusion torque among the above compositions was the one including dipentaerythritrol adipate stearate (Example C11C) which exhibited a fusion torque of 30, which is substantially greater than the value of 27.9 for the composition which includes a sucrose ester lubricant at the same loading (Example 11A). Moreover, at low loadings the compositions of the present invention (Example 11A) exhibits an impact resistance that is comparable to the impact resistance exhibited by the internal lubricant (Example C11A), which can not necessarily be said about any of the other external lubricants tested.

Example 12—Two Roll Mill Color Stability and Metal Release

Two PVC resin-containing compositions in accordance with the present invention (Examples 12A and 12B) are prepared. Each composition is essentially the same except that amount of sucrose ester in accordance with the present invention is different. Each composition is prepared by charging the constituent components into a 2 roll mill operated at roll temperature of 190C, a speed of 20/30 RPM, a nip of 0.015 inch, with samples being removed at three minute intervals and tested for color until either sticking is observed or the samples are black, which is an indication of stabilizer failure.

The length of time before sticking to the metal rolls of the two roll mill is measured. Also, after processing on the two roll mill, the color stability of composition is measured.

The results are described in Table E12A below.

TABLE E12A

| | Wt. Parts relative to 100 weight parts resin Example | |
|---|---|---|
| Constituent | 12A | 12B |
| Resin | 100 | 100 |
| Stabilizer | 1.5 | 1.5 |
| Processing aid | 1.5 | 1.5 |
| Supplemental additives | 10 | 10 |
| Oxidized polyethylene wax (AC-316A) | 0.08 | 0.08 |
| sucrose stearate lubricant | 0.17 | 0.42 |
| distearyl phthalate | 1.0 | 1.0 |

The results of the physical property analysis performed on the shaped product in accordance with this Example 12 are presented in Table E12B, below.

TABLE E12B

| | Example 12A | Example 12B |
|---|---|---|
| Sucrose Stearate plus OPE loading, PHR | 0.25 | 0.50 |
| Parameter | | |
| Color Stability, Yellowness Index* | | |
| @ 3 min. | 5.4 | 4.9 |
| @ 5 min. | 8.4 | 7.7 |
| @ 10 min. | 15.4 | 14.1 |
| @ 15 min. | 26.5 | 23.7 |

TABLE E12B-continued

|  | Example 12A | Example 12B |
|---|---|---|
| @ 20 min. | 42.6 | 38.8 |
| @ 25 min. | 79.9 | 69.9 |
| @ 30 min. | 37.8 | 42.8 |
| Metal Release (time to stick, min.) | 28-30 | 28-30 |

*measured in accordance with ASTM-B313

These data show that a composition containing sucrose ester lubricant, particularly in combination with oxidized polyethylene wax, advantageous color stability and metal release properties.

Comparative Example C12—Two Roll Mill Color Stability and Metal Release

The procedure of Example 12 is repeated except that the combination of sucrose ester and oxidized polyethylene wax is replaced by a combination of two commercially available lubricants, namely products sold under the trade designations Loxiol 7111 and 7107 by Cognis. The Loxiol 7111 is present in the composition in an amount of 1 PHR and the Loxiol 7107 is present in an amount in one case of 0.25 PHR and in the other case of 0.5 PHR, for an aggregate loading in each case much greater than that used in Example 12. The results of the physical property testing are provided in Table CE12 below.

TABLE CE-12

|  | Example C12A | Example C12B |
|---|---|---|
| Lubricant (Loxiol 7111 plus 7107) loading, PHR | 1.25 | 1.50 |
| Parameter | | |
| Color Stability, Yellowness Index* | | |
| @ 3 min. | 5.8 | 5.2 |
| @ 5 min. | 8.2 | 8.0 |
| @ 10 min. | 14.4 | 14.0 |
| @ 15 min. | NA | 23.8 |
| @ 20 min. | NA | 39.0 |
| @ 25 min. | NA | 60.8 |
| @ 30 min. | NA | 74.4 |
| Metal Release (time to stick, min.) | 8-10 | 28-30 |

*measured in accordance with ASTM-B313

These data show that certain PVC resin-containing compositions formed from a composition containing typical prior lubricants exhibit physical properties, particularly yellowness index and metal release, substantially inferior to those achieved in accordance with one aspect of the present invention. Even when the loading in total loading using the prior art lubricant is much greater than in Example 12 (see Example C12A) the metal release and yellowness index is substantial less desirable than in accordance with the present invention.

Examples 13A, B, C and D—Degree of Ester Substitution—Stearate

Four PVC resin-containing extrudable composition substantially in accordance with the procedure as described in Example 1 are prepared with the same constituents, except that the specific saccharide ester composition used in each is different. More specifically, Example 13A is based on a saccharide ester component comprising at least about 70% by weight of octa-substituted sucrose stearate and having a hydrophilic/lipophilic balance (HLB value) of less than 1, indicating a very high degree of ester substitution. Examples 13B and 13C are based on a saccharide ester component comprising sucrose stearate having HLB values of 7 and 16 respectively. Each composition was subjected to the same Brabender torque rheometer test and analysis as described above to determine fusion and stability time, equilibrium and fusion torque and equilibrium temperature according to ASTM standard testing procedure D2538. The results are presented in Table E13 and discussed below.

TABLE E13

| Parameter | Example 13A | Example 13B | Example 13C |
|---|---|---|---|
| HLB of Ester | <1 | 7 | 16 |
| Equilibrium Temp (° C.) | 212 | 215 | 216 |
| Fusion Torque (mg) | 3,370 | 3,900 | 4,050 |
| Equilibrium Torque (mg) | 1,860 | 1930 | 1930 |
| Fusion Time (min) | 0.78 | 0.45 | 0.43 |
| Dynamic Stability time, min.* | 14 | 10 | 11 |

*elapsed time between fusion and measurable onset of cross-linking (minutes)

As the above table illustrates, applicants have discovered that the degree of substitution of the saccharide ester in accordance with the present invention has a significant beneficial effect on the fusion characteristics of the shapeable composition, particularly the equilibrium temperature, the fusion and equilibrium torque, fusion time and dynamic stability, with the higher level of substitution exhibiting superior performance than compositions based on lower levels of substitution. Without being bound by or to any theory of operation, it appears that the compositions based on the saccharide esters having a higher degree of substitution, particularly predominantly octa stearate as in the case of Example 13A, exhibit properties characteristic of a higher degree of external lubrication than the lower substituted saccharide esters, as evidenced by the increased fusion time and reduced fusion torque. However, at the equilibrium condition, the melt temperature of the predominately octa substituted saccharide ester is considerably less than that of the lower substituted compounds, and the equilibrium torque is equal to or lower than that of the lower substituted compounds. Finally the dynamic heat stability appears to be beneficially impacted by the use of compositions based on a high degree of substitution; particularly compounds having predominantly octa substituted saccharides.

Examples 14A, B, C and D—Degree of Ester Substitution—Soyate

Four PVC resin-containing extrudable compositions substantially in accordance with the procedure as described in Example 1 are prepared with the same constituents, except that the specific saccharide ester composition used in each is different. More specifically, Example 14A is based on a saccharide ester component comprising at least about 70% by weight of octa-substituted sucrose soyate and having a hydrophilic/lipophilic balance (HLB value) of about 1, indicating a very high degree of ester substitution. Example 14B is based on a saccharide ester component comprising sucrose soyate having a molar average degree of esterification of about 6 and in which approximately 34% by weight are hexa-substituted, approximately 25% by weight are hepta-substituted, and approximately 8% by weight are octa-substituted. Example 14C is based on a saccharide ester component comprising sucrose soyate having a molar average degree of esterification of about 5 and in which approximately 29% by weight are penta-substituted, approximately 22% by weight are hepta-substituted, and approximately 1.8% by weight are octa-substituted. Example 14D is based on a saccharide ester component comprising sucrose soyate having a molar average degree of esterification of about 4 and in which approximately 35% by weight are tetra-substituted, approximately 30% by weight are penta-substituted, and approximately 0.4% by weight are octa-substituted. Each composition was subjected to the same Brabender torque rheometer test and analysis as described above to determine fusion and stability time, equilibrium and fusion torque and equilibrium temperature according to ASTM standard testing procedure D2538. The results are presented in Table E14 and discussed below.

TABLE E14

| Parameter | Example 14A | Example 14B | Example 14C | Example 14D |
|---|---|---|---|---|
| Molar Average Degree of Ester Substitution | Hepta-Octa (7-8) | Hexa (6) | Penta (5) | Tetra (4) |
| Equilibrium Temp (° C.) | 212 | 214 | 214 | 214 |
| Fusion Torque (mg) | 3,300 | 3,600 | 3,500 | 3,600 |
| Equilibrium Torque (mg) | 1890 | 2000 | 2000 | 2125 |
| Fusion Time (min) | 0.8 | 0.75 | 0.75 | 0.75 |
| Dynamic Stability time, min.* | 14 | 11 | 11.75 | 12 |

*elapsed time between fusion and measurable onset of cross-linking

The table above provides further indication of applicants' discovery that the degree of substitution of the saccharide ester in accordance with the present invention has a significant beneficial effect on the fusion characteristics of the shapeable composition, particularly the equilibrium temperature, the fusion and equilibrium torque, fusion time and dynamic stability, with the higher level of substitution exhibiting superior performance than compositions based on lower levels of substitution. In accordance with preferred embodiments, as illustrated in the examples presented herein, the present shapeable compositions have dynamic color stability, as measured by the elapsed time between fusion and measurable onset of cross-linking, of greater than about 10 minutes, more preferably greater than about 12 minutes, and even more preferably greater than about 13 minutes. In certain highly preferred embodiments, the heat stability time is at least about 14 minutes.

Examples 15A, B and C—Ester Chain Length

Three PVC resin-containing extrudable composition substantially in accordance with the procedure as described in Example 1 are prepared with the same constituents, except that the specific saccharide ester composition used in each is different. More specifically, Example 15A is based on a saccharide ester component comprising at least about 70% by weight of octa-substituted sucrose stearate and HLB value of less than 1. The average chain length of the ester moiety in Example 15A is about C18. Example 15B is based on a saccharide ester component comprising sucrose soyate having at least about 70% by weight of octa-substituted sucrose soyate and HLB value of less than 1. The average chain length of the ester moiety in Example 15B is about C16-C18. Example 15C is based on a saccharide ester component comprising sucrose laurate having an HLB value of about 1. The average chain length of the ester moiety in Example 15C is about C12.

Each composition was subjected to the same Brabender torque rheometer test and analysis as described above to determine fusion and stability time, equilibrium and fusion torque and equilibrium temperature according to ASTM standard testing procedure D2538. The results are presented in Table E15 and discussed below.

TABLE E15

| Parameter | Example 15A | Example 15B | Example 15C |
|---|---|---|---|
| Average Ester Chain Length | C16-18 | C16-18 | C12 |
| HLB of Ester | <1 | <1 | 1 |
| Equilibrium Temp (° C.) | 212 | 213 | 216 |
| Fusion Torque (mg) | 3,370 | 3,360 | 3,780 |
| Equilibrium Torque (mg) | 1,860 | 1890 | 1940 |
| Fusion Time (min) | 0.78 | 0.8 | 0.56 |
| Dynamic Stability time, min.* | 14 | 14 | 10 |

*elapsed time between fusion and measurable onset of cross-linking (minutes)

As the above table illustrates, applicants have discovered that the fatty acid from which the saccharide ester is formed in accordance with the present invention can have a significant effect on the fusion characteristics of the shapeable composition, particularly the equilibrium temperature and dynamic stability, with the higher chain length esters, preferable those esters in which the average chain length is greater than about C12 and even more preferably wherein the average chain length is at least about C16. Furthermore, the preferred saccharide esters also preferably have a high degree of ester substitution, for example, low HLB values, preferably less than about 5, more preferably less than about 2, and even more preferably not greater than about 1.

What is claimed is:

1. A shapeable resin-containing composition comprising:
   a) at least one shapeable resin; and
   b) and at least one saccharide ester compound of Formula I:

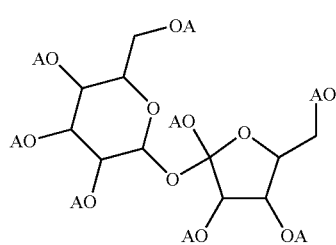

Formula I wherein each "A" is independently hydrogen or Structure I

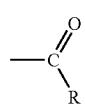

Structure I wherein each "R" is independently an aliphatic or aromatic moiety of about eight to about 40 carbon atoms, and wherein all of the "A" moieties of at least about 70 wt. % of the compounds of Formula I comprise a stearyl moiety.

2. The composition of claim 1 wherein said saccharide ester is present in an amount effective to improve the shapeability of said composition relative to the shapeability of said composition in the absence of said saccharide ester.

3. The composition of claim 1 wherein saccharide ester is present in an amount effective to improve the shapeability of said composition by at least about 10 percent relative to the shapeability of said composition in the absence of said saccharide ester.

4. The composition of claim 1 in the form of an extrudable composition and wherein said saccharide ester is present in an amount effective to reduce the extrusion torque required to extrude said extrudable composition.

5. The composition of claim 1 wherein said saccharide ester is present in an amount effective to improve the color stability of the shapeable composition relative to said composition in the absence of said saccharide ester.

6. The composition of claim 1 wherein said saccharide ester is present in an amount effective to improve the metal release characteristics of the shapeable composition relative to said composition in the absence of said saccharide ester.

7. A composition comprising polyvinyl chloride resin and at least one disaccharide ester, said at least one saccharide ester comprising at least about 50 wt. % of at least highly substituted saccharide esters.

8. The composition of claim 7 wherein said saccharide ester is present in said shapeable composition in an amount of from about 0.01 parts per hundred parts of resin (PHR) to about 2 PHR.

9. The composition of claim 7 wherein said highly substituted saccharide esters comprise at least one sucrose ester.

10. The composition of claim 9 wherein said at least one sucrose ester comprises sucrose stearate.

11. The composition of claim 7 wherein said at least one saccharide ester is present in an amount effective to affect at least one property of the composition selected from the group consisting of reducing the apparent viscosity of said composition, increasing the dynamic heat stability of said composition in a plastic flow state, increasing the gloss of the composition upon extrusion of the composition, and combinations of these.

12. The composition of claim 7 wherein said at least one saccharide ester compound comprises at least about 70 percent by weight of at least hepta- substituted sucrose esters of stearic acid.

13. The composition of claim 7 wherein said at least on saccharide ester comprises at least one disaccharide ester in an amount of at least about 0.01 PHR.

14. The composition of claim 13 wherein said at least one disaccharide ester comprises at least one compound selected from the group consisting of sucrose soyate, sucrose behenate, and combinations of these.

15. The composition of claim 14 further comprising at least one additional constituent, said at least one additional constituent comprising oxidized polyethylene wax.

16. The composition of claim 7 having a dynamic thermal stability of greater than about 10 minutes.

17. The composition of claim 7 having a dynamic thermal stability of greater than about 12 minutes.

18. The composition of claim 7 wherein said saccharide ester comprises at least one disaccharide ester formed from one or more fatty acids having, on average, greater than about 12 carbon atoms.

19. The composition of claim 7 wherein said saccharide ester comprises at least one disaccharide ester formed from one or more fatty acids having, on average, from about 16 to about 20 carbon atoms in the aliphatic portion of the chain.

20. The composition of claim 19 wherein said at least one disaccharide ester is a substantially fully saturated.

21. The composition of claim 7 wherein said saccharide ester has an HLB value of not greater than about 5.

22. The composition of claim 7 wherein said saccharide ester has an HLB value of not greater than about 4.

23. The composition of claim 7 wherein said saccharide ester has an HLB value of not greater than about 2.

24. A composition comprising polyvinyl chloride resin and at least about 0.01 pphr of at least one disaccharide ester, said at least one disaccharide ester comprising at least about 50 wt. % of at least highly substituted sucrose esters of stearic acid.

25. The composition of claim 24 wherein said at least one disaccharide ester is present in an amount effective to improve the metal release characteristics of composition relative to the same composition in the absence of the said at least one disaccharide ester.

26. The composition of claim 24 wherein said at least one disaccharide ester consists essentially of compounds of Formula I Formula I:

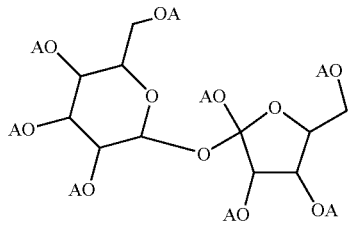

wherein "A" is hydrogen or has the structure of Structure I:

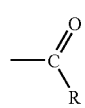

Structure I wherein "R" is an aliphatic or aromatic moiety of about eight to about 40 carbon atoms, and wherein at least about 70 percent by weight of said compounds have at least seven "A" moieties of Formula I being a moiety of Structure I.

27. The composition of claim 26 wherein the "R" moiety of Structure I is a stearyl moiety.

28. The composition of claim 24 wherein said composition comprises disaccharide ester in an amount of from about 0.05 PHR to about 0.9 PHR.

29. The composition of claim 24 wherein said disaccharide ester further comprises a compound selected from the group consisting of sucrose soyate, behenate and combinations of these.

30. The composition of claim 26 wherein at least about 70 wt. % of said disaccharide ester compounds are octa-substituted with an "A" group of Structure I wherein the "R" group of Structure I comprises an aliphatic moiety that is linear or branched saturated or unsaturated which comprises between about 8 and about 40 carbon atoms and which is optionally substituted with one or more halogen or functional groups containing oxygen.

31. The composition of claim 24 wherein the amount of disaccharide ester present in said composition is from about 0.1 PHR to about 0.8 PHR.

32. The composition of claim 24 further comprising least one lubricant selected from the group consisting of paraffin wax lubricants and oxidized polyethylene lubricants, and combinations of these.

33. The composition of claim 24 further comprising at least one supplemental heat stabilizer selected from the group consisting of tin-based heat stabilizers, organic-based heat stabilizers, heavy metal-based heat stabilizers and mixed metal-based heat stabilizers.

34. The composition of claim 24 further comprising a mixture of calcium hydroxide and stearic acid present in a ratio of from about 1:6 to about 1:10.

35. The composition of claim 24 further comprising a mixture of calcium oxide and stearic acid present in a ratio of from about 1:6 to about 1:10.

36. A shaped product formed by shaping the composition of claim 24.

37. A rigid sheet comprising a shaped product formed by shaping the composition of claim 36.

38. The composition of claim 24 not including a heat stabilizing amount of epoxidation products of fatty acids.

39. A pipe fitting formed from the composition of claim 24.

40. A blister pack formed from the composition of claim 24.

41. A shapeable resin-containing composition comprising:
a) at least one shapeable resin; and
b) and at least one dissaccharide ester comprising at least about 90% by weight of highly substituted sucrose stearate.

42. The composition of claim 41 wherein said saccharide ester is present in an amount effective to improve the shapeability of said composition relative to the shapeability of said composition in the absence of said sucrose stearate.

43. The composition of claim 41 wherein at least about 60 wt. % of said sucrose stearate is octa-substituted.

44. A composition consisting essentially of: (a) at least one shapeable resin; (b) at least one disaccharide ester, said at least one disaccharide ester comprising at least about 50 wt. % of at least highly substituted disaccharide esters; and (c) at least one optional adjuvant selected from the group consisting of supplemental lubricant, supplemental stabilizer, filler and combinations of two or more of these.

45. The composition of claim 44 wherein said highly substituted disaccharide esters comprise at least one sucrose ester.

46. The composition of claim 44 not including any substantial amount of epoxidation products of fatty acids.

47. Credit card stock comprising at least a portion of the rigid sheet of claim 38.

* * * * *

UNITED STATES PATENT AND TRADEMARK OFFICE
CERTIFICATE OF CORRECTION

| | | |
|---|---|---|
| PATENT NO. | : 7,659,331 B2 | Page 1 of 1 |
| APPLICATION NO. | : 11/131694 | |
| DATED | : February 9, 2010 | |
| INVENTOR(S) | : Gibson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this

Thirtieth Day of November, 2010

David J. Kappos
*Director of the United States Patent and Trademark Office*